United States Patent
Zuo et al.

(10) Patent No.: US 9,792,019 B2
(45) Date of Patent: *Oct. 17, 2017

(54) METHOD AND TERMINAL DEVICE FOR SELECTING CHARACTER

(71) Applicant: Xiaomi Inc., Beijing (CN)

(72) Inventors: Jinglong Zuo, Beijing (CN); Guoshi Xu, Beijing (CN); Shaowei Zhang, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,518

(22) Filed: Nov. 25, 2015

(65) Prior Publication Data
US 2016/0077713 A1    Mar. 17, 2016

Related U.S. Application Data

(63) Continuation of application No. 14/334,670, filed on Jul. 18, 2014, now Pat. No. 9,377,949.

(30) Foreign Application Priority Data

Sep. 27, 2013    (CN) .......................... 2013 1 0452543

(51) Int. Cl.
*G06F 3/0484* (2013.01)
*G06F 3/0488* (2013.01)
(Continued)

(52) U.S. Cl.
CPC ........ *G06F 3/04842* (2013.01); *G06F 3/0233* (2013.01); *G06F 3/041* (2013.01); *G06F 3/0484* (2013.01); *G06F 3/0488* (2013.01)

(58) Field of Classification Search
CPC ............. G06F 3/04883; G06F 3/04842; G06F 3/0233; G06F 3/041; G06F 3/0488; G06F 3/0484
See application file for complete search history.

(56) References Cited

U.S. PATENT DOCUMENTS

2004/0155869 A1* 8/2004 Robinson .............. G06F 3/0219
345/168
2011/0022991 A1* 1/2011 Hillis .................. G06F 3/04883
715/863
(Continued)

FOREIGN PATENT DOCUMENTS

CN           101504579 A       8/2009
CN           101526881 A       9/2009
(Continued)

OTHER PUBLICATIONS

The extended European Search Report for 14186672.3.
The website page "Dividing Common Desktop to Private Corners".
"International Search Report for PCT/CN2014/077098".

*Primary Examiner* — Sahlu Okebato
(74) *Attorney, Agent, or Firm* — Jun He Law Offices P.C.; James J. Zhu (57) ABSTRACT

The present disclosure discloses a method and a terminal device for selecting a character. The method includes: detecting a touch point of a user gesture acting on the touch screen, wherein the touch point falls into a touch point node; searching a plurality of nodes of the contents to find a nearest text node to the touch point, when the touch point node is not a text node; and selecting a nearest character to the touch point within the nearest text node. Therefore, by taking the nearest character to the touch point in the nearest text node as the character selected by the touch point, even if the touch point of a user gesture does not fall on a character, it is still possible to obtain the character selected by the user gesture, thereby repeated selecting operations may be avoided, so as to provide convenience for the user.

20 Claims, 7 Drawing Sheets

(51) Int. Cl.
*G06F 3/023* (2006.01)
*G06F 3/041* (2006.01)

(56) References Cited

U.S. PATENT DOCUMENTS

| | | |
|---|---|---|
| 2012/0068941 A1 | 3/2012 | Arrasvuori et al. |
| 2012/0185511 A1 | 7/2012 | Mansfield et al. |
| 2012/0185765 A1 | 7/2012 | Mansfield et al. |
| 2012/0280931 A1 | 11/2012 | Stephanick et al. |
| 2013/0046544 A1 | 2/2013 | Kay et al. |

FOREIGN PATENT DOCUMENTS

| | | |
|---|---|---|
| CN | 102243642 A | 11/2011 |
| CN | 102880418 A | 1/2013 |
| CN | 102937864 A | 2/2013 |
| CN | 103034411 A | 4/2013 |
| CN | 103076982 A | 5/2013 |
| CN | 103135901 A | 6/2013 |
| CN | 103207742 A | 7/2013 |
| CN | 103294232 A | 9/2013 |
| CN | 103294361 A | 9/2013 |
| CN | 103472998 A | 12/2013 |
| EP | 2713247 A1 | 4/2014 |
| JP | 2012155714 A | 8/2012 |
| KR | 1020120083866 A | 3/2014 |
| TW | 200919317 A | 5/2009 |
| WO | 2013/123876 A1 | 8/2013 |

\* cited by examiner

METHOD AND TERMINAL DEVICE FOR SELECTING CHARACTER

CROSS-REFERENCE TO RELATED APPLICATIONS

This application is a Continuation of U.S. patent application Ser. No. 14/334,670, filed Jul. 18, 2014, which is a Continuation-In-Part of International Application PCT/CN2014/077098, with an international filing date of May 9, 2014, claiming the benefit of priority to Chinese Patent Application No. 201310452543.2, filed on Sep. 27, 2013, the entire contents of which are incorporated herein by reference.

TECHNICAL FIELD

The present disclosure generally relates to a field of computer technology, and more particularly, to a method and terminal device for selecting a character from content displayed in a touch screen.

BACKGROUND

With continuous development of mobile terminal technology, mobile devices such as smart mobile phones, tablet PCs are becoming increasingly popular in daily lives. Currently, the vast majority of mobile terminals are equipped with touch screens, on which various user gestures may be performed by users to operate the mobile terminal.

For example, a user may come across a favorite article, phrase or sentence that he/she intends to copy when browsing a webpage on a mobile terminal. Then, a touch gesture may be used to select characters in a corresponding location. The touch gestures commonly used include, for example, a long press, a double click or a single click.

However, when the characters displayed on a touch screen are too small or a user cannot precisely controls touch points of his/her gesture, such method for selecting a character cannot allow the user to select a character accurately through a touch gesture. For example, when the characters displayed on the touch screen are too small, a long press gesture of the user is likely to fall into a location between two lines of characters or in some other space area. Then, the terminal device may not select the characters for the user since the touch point of the user does not fall on the characters.

SUMMARY

Accordingly, the present disclosure provides a method and terminal device for effectively selecting a character even if the gesture acting on the touch screen does not fall on the characters.

According to a first aspect of the embodiments of the present disclosure, the present disclosure provides a method for selecting a character from content displayed in a touch screen, comprising: detecting a touch point of a user gesture acting on the touch screen, wherein the touch point falls into a touch point node; searching a plurality of nodes of the contents to find a nearest text node to the touch point, when the touch point node is not a text node; and selecting a nearest character to the touch point within the nearest text node.

According to an embodiment of the present disclosure, even if the touch point of the user gesture does not fall on a character, the terminal device is still able to search and select a character from the contents displayed in the touch screen as "the selected character", thereby repeated selecting operations may be avoided, so as to provide convenience for the user.

According to a second aspect of the embodiments of the present disclosure, the present disclosure further provides an apparatus for selecting a character from content displayed in a touch screen, comprising: a detection module configured to detect a touch point of a user gesture acting on the touch screen, wherein the touch point falls into a touch point node; a searching module configured to search a plurality of nodes of the contents to find a nearest text node to the touch point, when the touch point node is not a text node; and a selection module configured to select a nearest character to the touch point within the nearest text node.

According to a third aspect of the embodiments of the present disclosure, the present disclosure provides a terminal device such as a smart electronic terminal device. The terminal device includes a touch screen display for displaying content; a processor; and a memory for storing instructions executable by the processor, wherein the processor is configured to execute instructions for: detecting a touch point of a user gesture acting on the touch screen, wherein the touch point falls into a touch point node; searching a plurality of nodes of the contents to find a nearest text node to the touch point, when the touch point node is not a text node; and selecting a nearest character to the touch point within the nearest text node.

According to a fourth aspect of the embodiments of the present disclosure, a non-transitory readable storage medium including instructions, executable by a processor in a terminal device, for performing the method for selecting a character from content displayed in a touch screen, the method comprising: detecting a touch point of a user gesture acting on the touch screen, wherein the touch point falls into a touch point node; searching a plurality of nodes of the contents to find a nearest text node to the touch point, when the touch point node is not a text node; and selecting a nearest character to the touch point within the nearest text node.

Other characters and advantages of the present disclosure will be set forth in the following description, and will in part become apparent from the description, or may be appreciated through the practice of the present disclosure. The objects and other advantages of the present disclosure may be realized and obtained through the structures particularly pointed out in the written description, the claims and the accompanying drawings.

It may be appreciated that, the above general description and the following detailed description below are merely exemplary, and do not limit the disclosure. The technical solution of the present disclosure will be described in further detail with reference to accompanying drawings and embodiments.

BRIEF DESCRIPTION OF THE DRAWINGS

The accompanying drawings which constitute a part of the description and serve to explain the present disclosure together with the embodiments of the present disclosure, are provided for a better understanding of the present disclosure, but do not constitute a limitation to the present disclosure. In the drawings.

Explicit embodiments of the present disclosure that have been illustrated in the above accompanying drawings will be described in more detail hereinafter. These accompanying drawings and description are by no means intended to limit the scope of the idea of the present disclosure, but to explain the concept of the present disclosure to those skilled in the art with reference to particular embodiments.

Detailed Description

In order to make the objects, the technical solutions and advantages more clear, the present disclosure will be described in further detail with reference to the embodiments and the accompanying drawings. Here, the illustrative embodiments of the present disclosure and the description thereof are not intended to limit the present disclosure, but to explain the present disclosure.

Data content, such as a character or image can be displayed in a touch screen of a terminal device, such as a mobile phone and a personal digital assistant (PDD), etc. The terminal device includes a touch screen not only for displaying content but also receiving user gestures acting on the touch screen. The content are represented by using structured data formats (such as a tree data format) to include a plurality of data elements. In the present disclosure, a data element included in contents displayed in the touch screen is referred as "a node". Accordingly, the content displayed in the touch screen may include a plurality of nodes. The types and definition of nodes are predefined for the nodes inserted into the content. Webpage content displayed in the touch screen, for example, may include a plurality of nodes, wherein only some nodes of the webpage content belong to text nodes. The present disclosure provides a method for flexibly selecting a character even when the touch point of a user's gesture does not fall on the characters or falls into text nodes.

Figure 1:
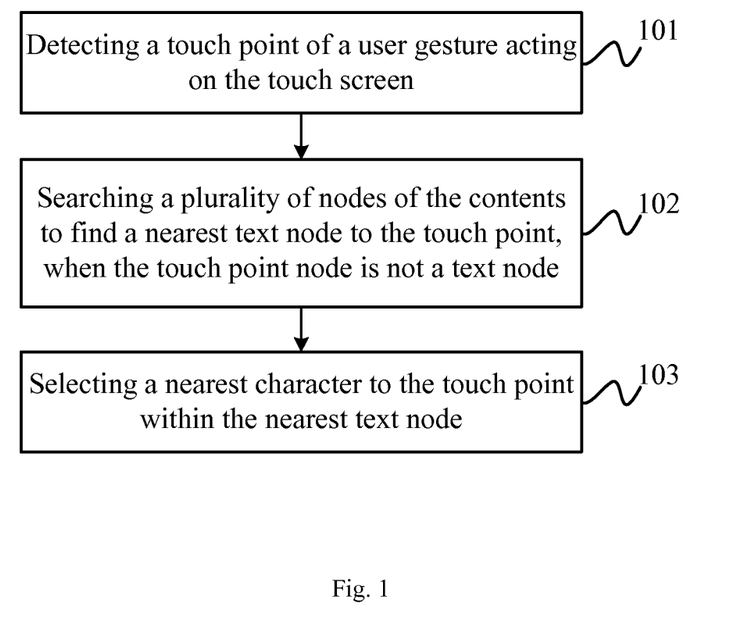
FIG. 1 is a schematic flowchart collectively illustrating a method for selecting a character according to an embodiment of the present disclosure.

FIG. 1 is a schematic flowchart collectively illustrating a method for selecting a character according to an embodiment of the present disclosure.

As shown in FIG. 1, in step S101, a touch point of a user gesture acting on the touch screen is detected. In this case, the user gesture, such as a long press, a double click or a single click is acted on the touch screen by the user, consequently the user gesture generates a touch point on the touch screen. Because the contents displayed in the touch screen are represents as a plurality of nodes, the touch point falls into at least one of the plurality of nodes. The node where the touch point falls into is referred as a touch point node in the present disclosure.

In step S102, a plurality of nodes of the contents to find a nearest text node to the touch point is searched, when the touch point node is not a text node. Before proceeding to step S102, the terminal device needs to identify whether the user gesture acted on the display is a user gesture for selecting characters within the content. According to the present disclosure, the terminal device presets some specific gesture such as a long press, a double click or a single click acted on the touch screen as the gestures for selecting text ("text capture gestures"). Therefore, for example, in case that the long press is preset as one of the gestures for selecting characters, the terminal device determines whether the touch point node where the touch point of the user gesture falls into is a text node if the touch screen detect a long press.

When the touch point node itself is a text node, the method proceed to select a character in the touch point node according to character selection rules disclosed in the prior art. However, when the touch point node is not a text node, the method proceeds to step S102 to search for other nodes of the contents to find a nearest text node to the touch point.

In step S103, a nearest character to the touch point within the nearest text node is selected. After finding the nearest text node, the method proceeds to step S103 to determine a character to be selected because there may include at least one character in the nearest text node. According to the present disclosure, a nearest character to the touch point within the nearest text node is determined as "the selected character".

Here, the text node is a visible text node.

In the present disclosure, the nearest character within the nearest text node to the touch point is selected as "the character selected by the touch point" even if the touch point of the gesture does not fall into a text node. It may be realized that the character may still be selected even if the touch point of the text capture gesture does not fall on a character, thereby repeated selecting operations may be avoided, so as to provide convenience for the user.

In the method for selecting a character according to an embodiment of the present disclosure, the step of searching the nearest text node to the touch point may be started from a node where the touch point is located, namely the touch point node, to perform a hierarchical search to find text nodes associated with the touch point; then distances between the touch point and each of the found text nodes are calculated; and the calculated text node with a smallest distance is determined as the nearest text node to the touch point that has been searched out. By performing a hierarchical search according to levels of the nodes, searching efficiency may be improved. In addition, the node levels may be further restricted, thereby a balance between the speed of the search and the granularity of the search may be obtained.

Figure 2:
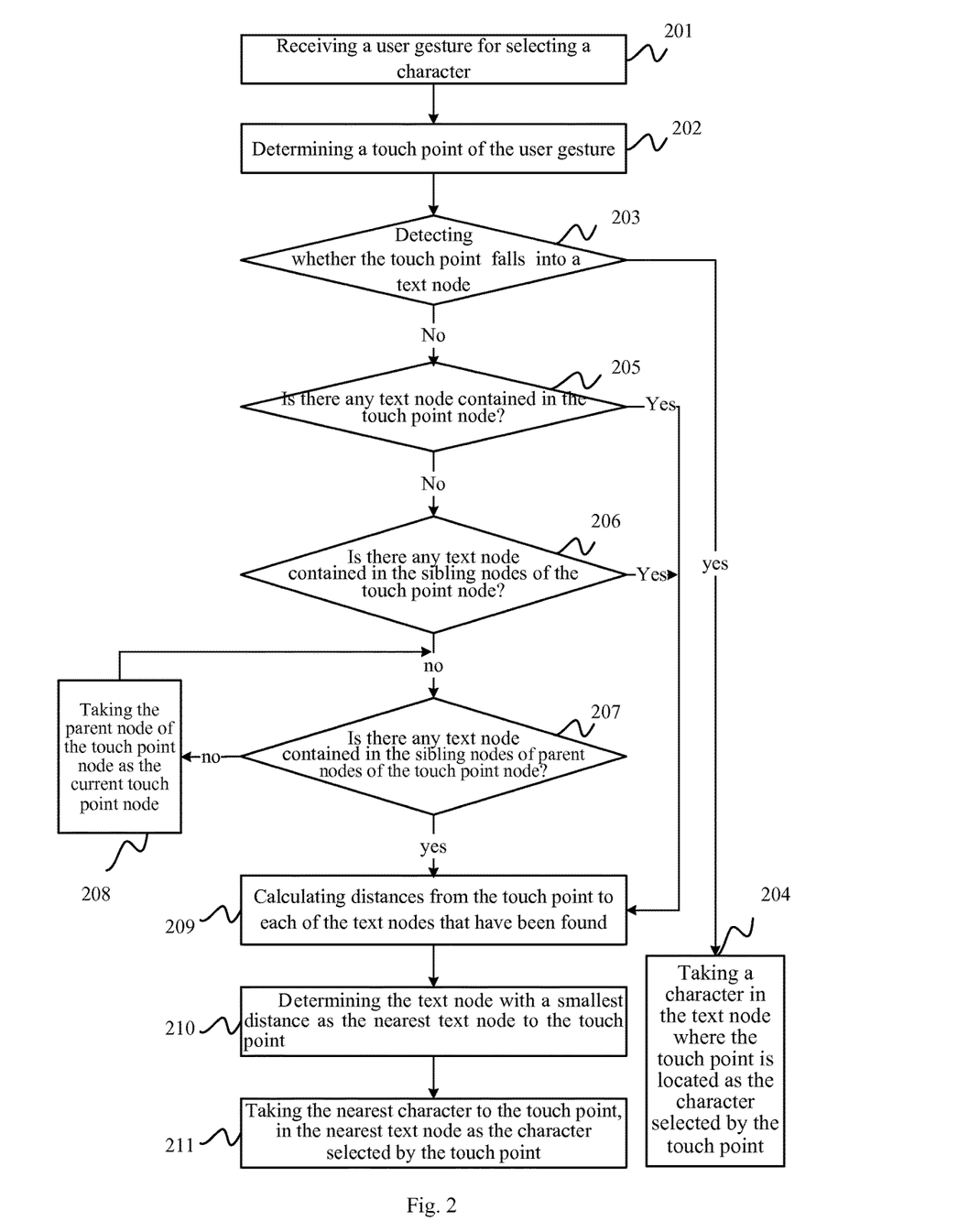
FIG. 2 is a schematic flowchart illustrating an example for selecting a character by performing a hierarchical search according to an embodiment of the present disclosure.

FIG. 2 is a schematic flowchart illustrating an example for selecting a character according to an embodiment of the present disclosure. In this example, the plurality of nodes of contents are organized as a node tree. The data contents to be displayed in a user interface, such as a webpage interface, are organized into a node tree with a plurality of nodes. All nodes can be accessed through the tree. The tree starts at the root node and branches out to the lowest level node of the tree. The nodes in the node tree have a hierarchical relationship to each other. The terms parent, child and sibling are used to describe the relationships of the nodes. Parent nodes have children nodes. Children nodes on the same level are called siblings nodes. Each node in the node tree possesses a level, which is defined by 1+ the number of connections between the node and the root node. The name, type, definition and parameters of nodes are predefined for each of the plurality of nodes in the node tree. For example, some of the nodes are defined as text nodes to contain text. The node tree can be organized by using structured data formats, for example, Extensible Markup Language (XML). It should be understood that the XML structure is by way of example as the functionality of the present disclosure is equally applicable to any data format for allowing the user to select a character.

With reference to FIG. 2, the hierarchical search is started from the touch point node, then to sibling nodes of the touch point node, and to sibling nodes of parent node of the touch point node, thereby to obtain the character selected by the touch point. For example, the process includes the following steps.

In step S201, a user gesture for selecting a character is received by the touch screen from a user.

In step S202, a touch point of the user gesture is determined.

In step S203, whether the touch point falls into a text node is detected; if yes, the method proceeds to step S204; otherwise, the method proceeds to step S205.

In step S204, because the touch point node itself is a text node, a character in the touch point node is taken as the character selected by the touch point.

In step S205, the touch point node is looked up to see whether the touch point node contains any child text node; if yes, the method proceeds to step S209 the method proceeds to step S206.

In step S206, sibling nodes of the touch point node are looked up to see whether the sibling node of the touch point node contains any text node; if yes, the method proceeds to step S209; otherwise the method proceeds to step S207.

In step S207, sibling nodes of the parent node of the touch point node are looked up to see whether the sibling node of the parent node contains any text node; if yes, the method proceeds to step S209; otherwise the method proceeds to step S208.

In step S208, the parent node of the touch point node, is taken as the current touch point node to proceed to step S207.

In step S209, distances from the touch point to each the text nodes that have been found, is calculated.

In step S210, the text node of the smallest distance is determined as the nearest text node to the touch point. In other words, the text node of the smallest distance is determined as "the nearest text node".

In step S211, the nearest character to the touch point, in the found text node is taken as "the character selected by the touch point".

In some exemplary embodiments, before the method further includes a step of determining whether the current node is a body node before the method proceeds to steps 205, 206 and 207. For example, before determining whether the touch point node contains any text node in the step S205, it should be determined whether the touch point node is a body node. If yes, the method ends. Similarly, before determining whether the sibling node of the touch point node contains any text node in the step S206, it should be determined whether the sibling node of the touch point node is a body node. If yes, the method ends. Likewise, before the step S207, it should be determined whether the sibling node of the parent node of the touch point node is a body node. If yes, the method ends.

In this embodiment, an exhaustive search method is applied. For example, in an interface shown in FIG. 3, a node 302 contains two children nodes 303 and 304. The node 305 is a sibling node of node 302 and the node 306 is the parent node of node 302. When the user gesture generates a touch point 301 on the touch screen, it is detected that the touch point 301 falls into the node 302. Accordingly, in this example, the node 306 is a touch point node. If the node 302 is not a text node, the terminal device will perform a hierarchical search. At first, it determines whether the node 302 contains any text node first. In other words, it determines whether the children node 303 or 304 is a text node. If neither of nodes 303 and 304 contained in the node 302 is a text node, the sibling node 305 of the node 302 is looked up to determine whether the sibling node 305 contains any children text node. If no text node is contained in the node 305, sibling nodes 307 and 308 of the parent node 306 of the node 302 are respectively looked up to determine whether either of the sibling nodes 307 and 308 of the parent node 306 contains any children text node.

Figure 3:
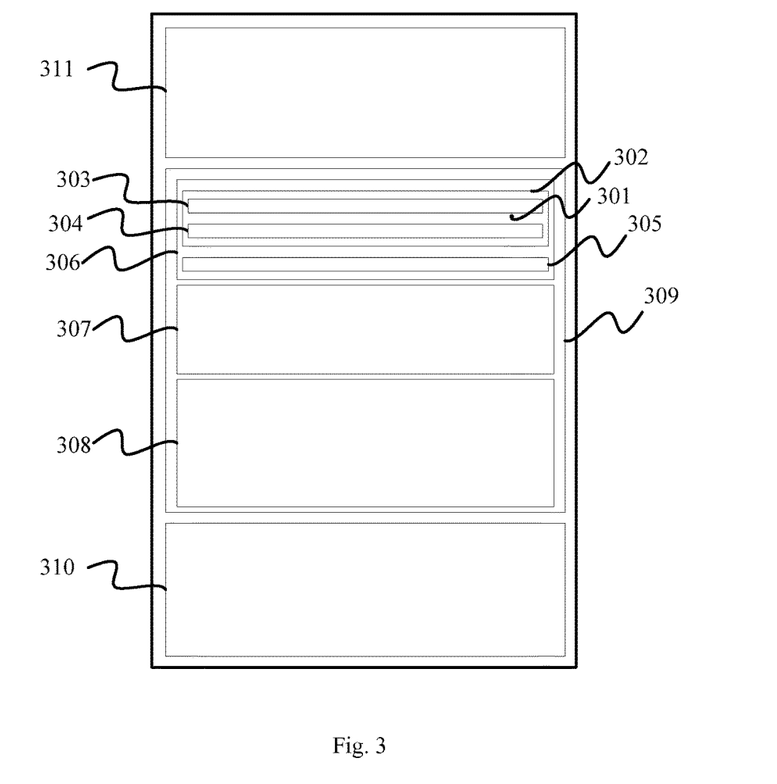
FIG. 3 is a schematic view illustrating an example of a plurality of nodes of the contents according to an embodiment of the present disclosure.

Furthermore, if there is still no text node contained in either of the nodes 307 and 308, the parent node 306 of the node 302 is taken as the current touch point node, and sibling nodes 310 and 311 of the parent node 309 of the current touch point node 306 is looked up to determined whether either of the nodes 310 and 311 contains any children text node. In the present disclosure, the term "touch point node" represents a node into which the touch point falls. Therefore, if the node 302 is a touch point node, its parent node 306 must be a touch point node too. In other word, the "touch point node" of the present disclosure does not only include the smallest node accommodating the touch point, but also includes the parent node of the smallest node. Accordingly, if there is no text node found when the smallest node is regarded as the touch point node, the parent node of the smallest node will be taken as the current touch point node to repeat the above steps S203-211.

In step S209 of the above embodiment, if at least one text node is found, based on the coordinates of the touch point and the coordinates of at least one found text node, it may be determined first which area around the found text node the touch point is located in, and then the distance from the touch point to each of the at least one found text node may be calculated according to which area around the found text node the touch point is located in. Depending on which area the touch point is located in, different distance calculation methods are applied, therefore calculation efficiency may be improved. Hereinafter, with reference to examples, it will be illustrated how the distance from the touch point to each found text node is calculated according to which area around the found text node the touch point is located in.

Figure 4:
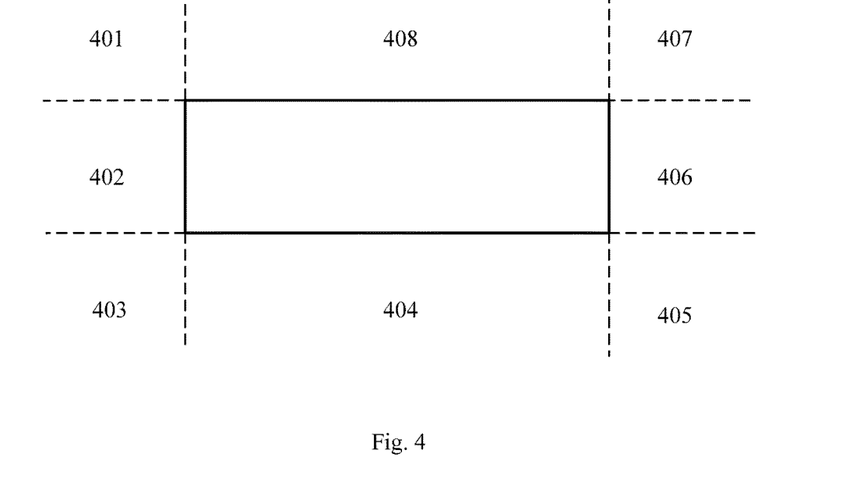
FIG. 4 is a schematic view illustrating an example of eight zones around the text node according to an embodiment of the present disclosure.

A node in an interface, such as a webpage interface, normally occupies a rectangular area. Based on coordinates of the touch point and coordinates of each of vertexes of the node, it may be determined which area of the node the touch point is located in. As shown in FIG. 4, in this example, the rectangular area around the text node is divided into 8 areas, respectively being: an upper left area 401, a left area 402, a lower left area 403, a lower area 404, a lower right area 405, a right area 406, an upper right area 407 and an upper area 408. Based on the coordinate of each of the four vertexes of the text node and the coordinate of the touch point, it is determined which area of the 8 areas the touch point is located in.

Figure 5:
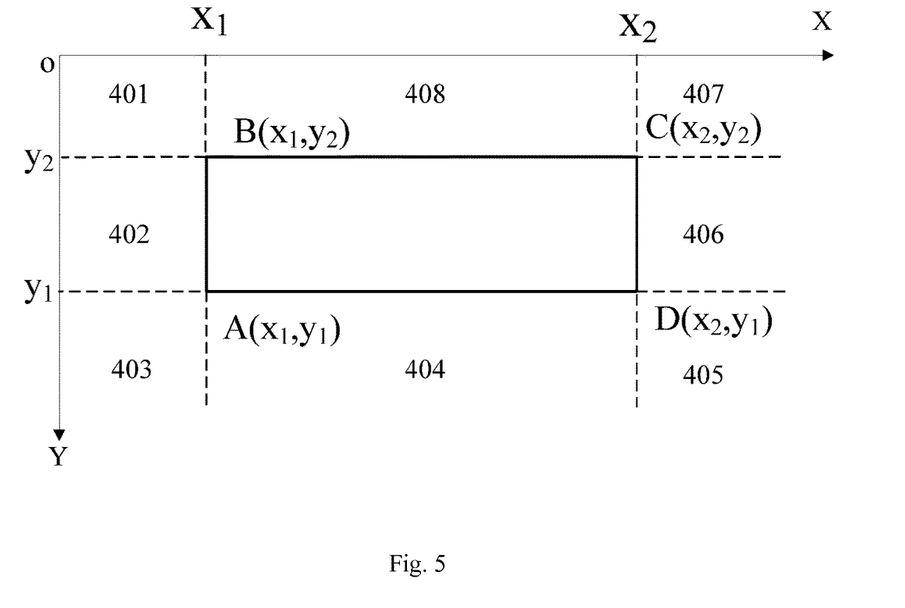
FIG. 5 is a schematic view illustrating an example of eight zones around the text node in a rectangular coordinate system according to an embodiment of the present disclosure.

For example, taking the coordinate system shown in FIG. 5 as an example, the coordinates of the four vertexes of the rectangular text node in the coordinate system are respectively $A(x_1, y_1)$, $B(x_1, y_2)$, $C(x_2, y_2)$ and $DD(x_2, y_1)$. The coordinate of the touch point P is $P(m, n)$. Which area the touch point is located in may be determined by comparing the coordinate of the touch point and the coordinates of the rectangular area, and different algorithm may be selected according to different area to calculate the distance from the touch point to the text node.

For example, if $m<x_1$, and $n<y_2$, the touch point P is located in the upper left area 401 of the text node. In this case, the distance S from the touch point P to the text node is $\sqrt{(x_1-m)^2+(n-y_2)^2}$.

If $m<x_1$, and $y_2 \leq n \leq y_1$, the touch point P is located in the left area 402 of the text node. In this case, the distance S from the touch point P to the text node is $|x_1-m|$.

If $m<x_1$, and $n>y_1$, the touch point P is located in the lower left area 403 of the text node. In this case, the distance S from the touch point P to the text node is $\sqrt{(x_1-m)^2+(n-y_1)^2}$.

If $x_1 \leq m \leq x_2$, and $n>y_1$, the touch point P is located in the lower area 404 of the text node. In this case, the distance S from the touch point P to the text node is $|y_1-n|$.

If $m>x_2$, and $n \leq y_1$, the touch point P is located in the lower right area 405 of the text node. In this case, the distance S from the touch point P to the text node is $\sqrt{(x_2-m)^2+(y_1-n)^2}$.

If $m>x_2$, and $y_2 \leq n \leq y_1$, the touch point P is located in the right area 406 of the text node. In this case, the distance S from the touch point P to the text node is $|m-x_2|$.

If $m>x_2$, and $n<y_2$, the touch point P is located in the upper right area 407 of the text node. In this case, the distance S from the touch point P to the text node is $\sqrt{(x_2-m)^2+(y_2-n)^2}$.

If $x_1 \leq m \leq x_2$, and $n<y_2$, the touch point P is located in the upper area 408 of the text node. In this case, the distance S from the touch point P to the text node is $|n-y_2|$.

To summarize, after finding at least one text node, the coordinates of the touch point and the coordinates of each found text node are compared first. Then the distance from the touch point to each found text node is calculated according to which area of the eight adjacent areas the touch point is located in. After calculating the distance for each of all the found text nodes, the text node with a smallest distance is determined as the nearest text node.

In step S211 of the above embodiment, because there may include a plurality of characters in the found nearest text node, the nearest character to the touch point within the nearest text node is selected. Based on coordinates of the touch point and coordinates of the nearest text node, it may be determined first which area around the nearest text node the touch point is located in. Then a location of the nearest character to the touch point, in the nearest text node may be determined according to which area around the nearest text node the touch point is located in.

Here, the determination of which area around the nearest text node the touch point is located in may use the above method for determining which area the touch point is located in, and will not be repeated any more.

Figure 6:
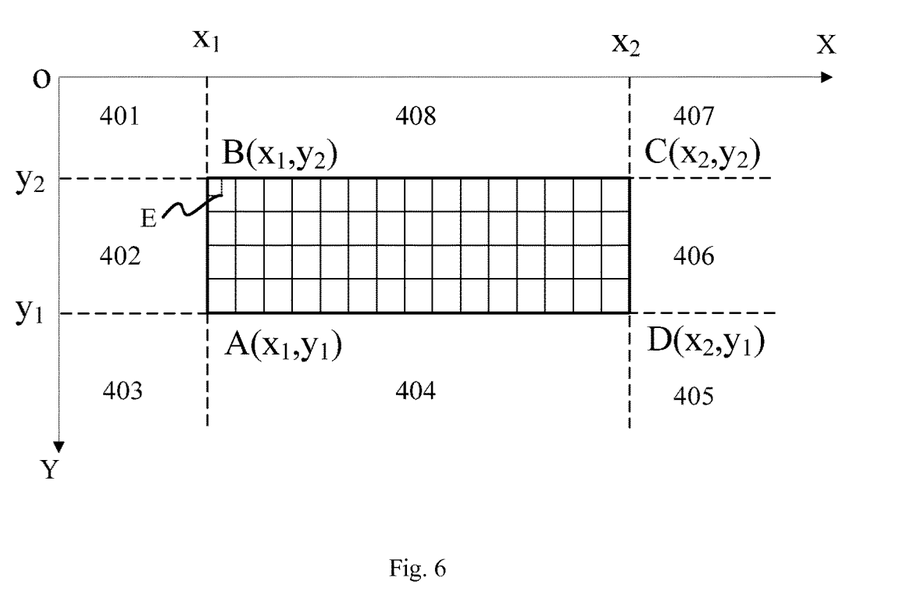
FIG. 6 is a schematic view illustrating an example of selecting a nearest character from the found text node according to an embodiment of the present disclosure.

Taking the example of the divided areas shown in FIG. 5, if the touch point is located in the upper left area 401 of the nearest text node, a horizontal coordinate of the location of the nearest character to the touch point, in the nearest text node is: $x_1+\frac{1}{2}\times w$, and a longitudinal coordinate thereof is: $y_2+\frac{1}{2}\times h$, as shown by a point E in FIG. 6.

If the touch point is located in the left area 402 of the nearest text node, a horizontal coordinate of the location of the nearest character to the touch point, in the nearest text node is: $x_1+\frac{1}{2}\times w$, and a longitudinal coordinate thereof is: n.

If the touch point is located in the lower left area 403 of the nearest text node, a horizontal coordinate of the location of the nearest character to the touch point, in the nearest text node is: $x_1+\frac{1}{2}\times w$, and a longitudinal coordinate thereof is: $y_1-\frac{1}{2}\times h$.

If the touch point is located in the lower area 404 of the nearest text node, a horizontal coordinate of the location of the nearest character to the touch point, in the nearest text node is: m, and a longitudinal coordinate thereof is: $y_1-\frac{1}{2}\times h$.

If the touch point is located in the lower right area 405 of the nearest text node, a horizontal coordinate of the location of the nearest character to the touch point, in the nearest text node is: $x_2-\frac{1}{2}\times w$, and a longitudinal coordinate thereof is: $y_1-\frac{1}{2}\times h$.

If the touch point is located in the right area 406 of the nearest text node, a horizontal coordinate of the location of the nearest character to the touch point, in the nearest text node is: $x_2-\frac{1}{2}\times w$, and a longitudinal coordinate thereof is: n.

If the touch point is located in the upper right area 407 of the nearest text node, a horizontal coordinate of the location of the nearest character to the touch point, in the nearest text node is: $x_2-\frac{1}{2}\times w$, and a longitudinal coordinate thereof is: $y_2+\frac{1}{2}\times h$.

If the touch point is located in the upper area 408 of the nearest text node, a horizontal coordinate of the location of the nearest character to the touch point, in the nearest text node is: m, and a longitudinal coordinate thereof is: $y_2+\frac{1}{2}\times h$.

Wherein, w is a width of the character, and h is a height of the character. Through the above method for determining the location of the character, since the width of the character and the height of the character is taken into consideration, it may be ensured that the character can be displayed on the corresponding location, so as to provide the character selected by the touch point.

It may be noticed that, the coordinate system in the above example in the present disclosure is merely for illustration, and not intended to limit the present disclosure. Alteration may be made based on the basic idea according to the above embodiment by those skilled in the art. For example, other coordinate systems may be used or the directions of the coordinate axes may be altered, and so on.

Figure 7:
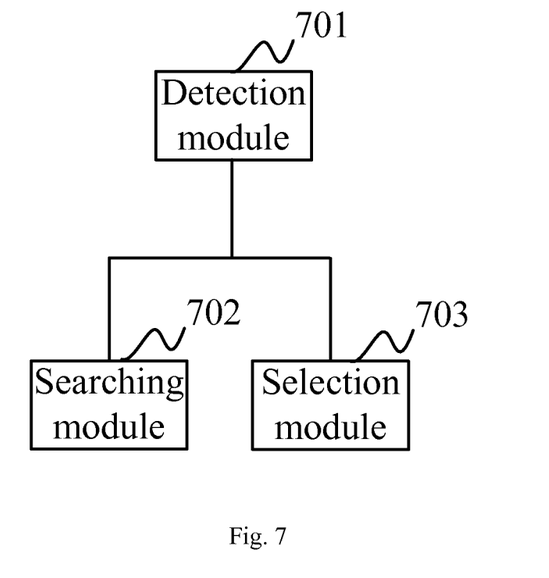
FIG. 7 is a block diagram illustrating an apparatus for selecting a character according to an embodiment of the present disclosure.

Accordingly, as shown in FIG. 7, the present disclosure further provides an apparatus for selecting a character. The apparatus includes: a detection module 701, configured to detect a touch point of a user gesture acting on the touch screen; a searching module 702, configured to search a plurality of nodes of the contents to find a nearest text node to the touch point; and a selection module 703, configured to select a nearest character to the touch point within the nearest text node is selected.

Figure 8:
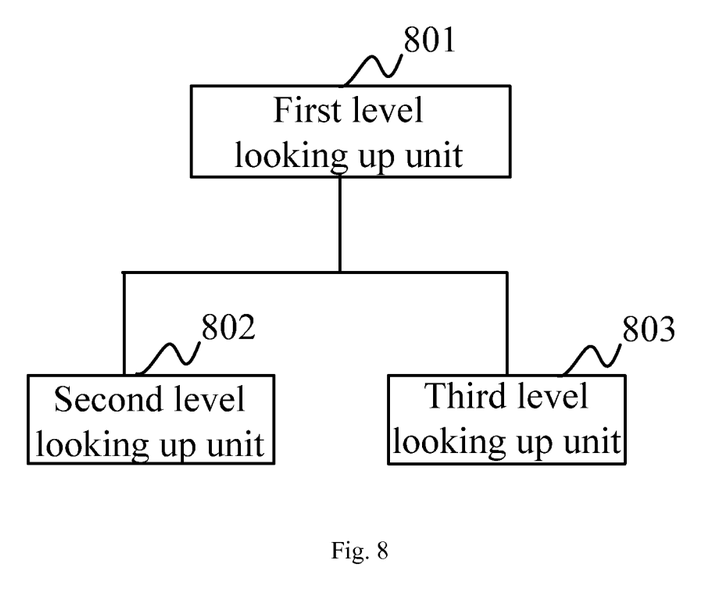
FIG. 8 is a block diagram illustrating a searching module in the apparatus for selecting a character according to an embodiment of the present disclosure.

As shown in FIG. 8, the searching module 702 includes: a first level searching unit 801, configured to determine whether the touch point node contains any text node; calculate the distance between the touch point and each text node contained in the touch point node when the touch point node contains at least one text node; and select the text node of the smallest distance as the nearest text node to the touch point.

Furthermore, the searching module 702 may include a second level searching unit 802, configured to determine whether a sibling node of the touch point node contains any text node, when the touch point node does not contain at least one text node; and calculate the distance between each text node contained in the sibling node and the touch point when the sibling node contains at least one text node.

Moreover, the searching module 702 may include a third level searching unit 803, configured to determine whether a sibling node of a parent node of the touch point node contains any text node, when none of the sibling nodes of the touch point node contains any text node; and calculate the distance between each text node contained in the sibling node of the parent node of the touch point node and the touch point when the sibling node of the parent node of the touch point node contains at least one text node.

Figure 9:
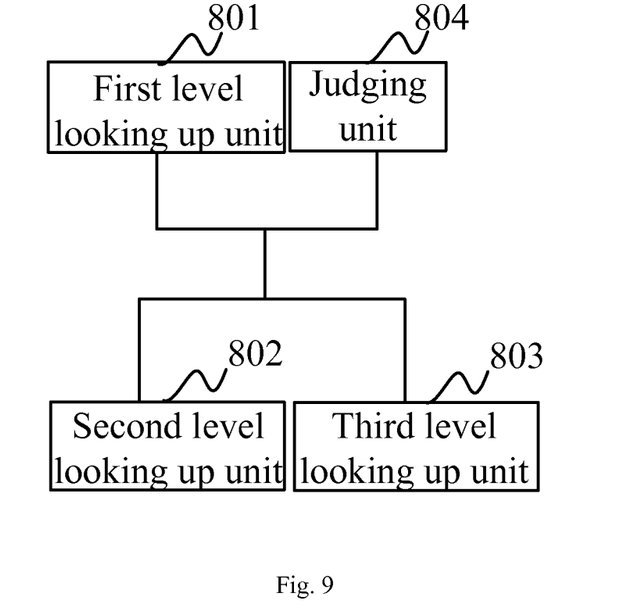
FIG. 9 is a block diagram illustrating another example of a searching module in the apparatus for selecting a character according to an embodiment of the present disclosure.

As shown in FIG. 9, the searching module 702 further includes: a judging unit 804, configured to judge whether the touch point node is a body node.

Figure 10:
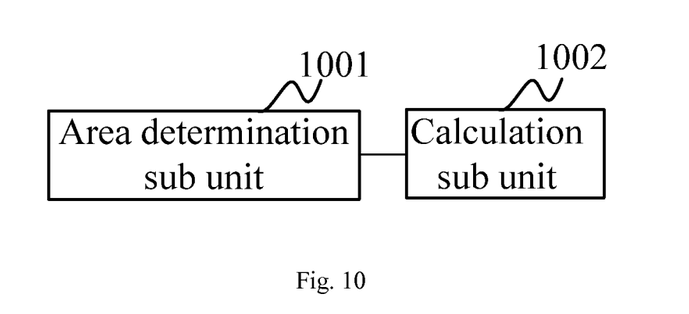
FIG. 10 is a block diagram illustrating a calculation unit in the searching module in the apparatus for selecting a character according to an embodiment of the present disclosure.

As shown in FIG. 10, the calculation unit 802 includes: an area determination sub unit 1001, configured to determine the coordinates of the four vortex of the at least one text node; and a calculation sub unit 1002, configured to calculate the distance between the touch point and each text node according to the coordinates of the touch point and the coordinates of the four vortex of the at least one text node. Moreover, the calculation sub unit 1002 is further configured to implement the steps described above by referring to FIG. 4.

Figure 11:
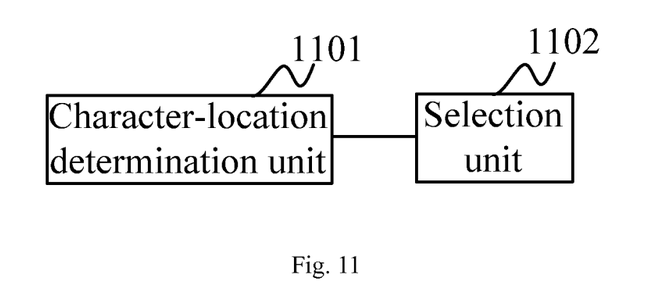
FIG. 11 is a block diagram illustrating a selection module in the apparatus for selecting a character according to an embodiment of the present disclosure.

As shown in FIG. 11, the selection module 703 includes: a character-location determination unit 1101, configured to determine the coordinates of the nearest character to the touch point, in the nearest text node according to the area around the nearest text node the touch point is located in; and a selection unit 1102, configured to select the character according to the determined coordinates as a character selected by the touch point.

Moreover, in an embodiment, the text node is a visible text node.

Figure 12:
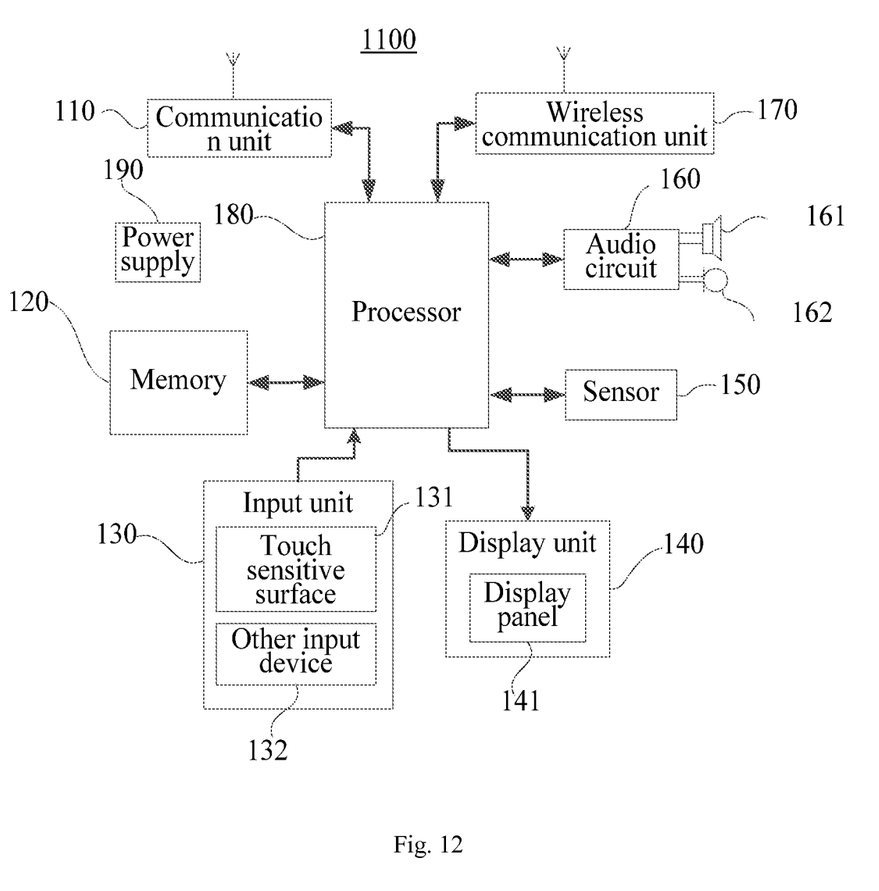
FIG. 12 is a block diagram illustrating a terminal device according to an embodiment of the present disclosure.

The present disclosure further provides a terminal device. FIG. 12 is a block diagram illustrating a terminal device according to an embodiment of the present disclosure. Referring to FIG. 12, the terminal device may be configured to perform the method for selecting a character according to an embodiment of the present disclosure.

The terminal device 1100 may include a communication unit 110, a memory 120 including one or more computer-readable storage media, an input unit 130, a display unit 140, a sensor 150, an audio circuit 160, a WiFi (Wireless Fidelity) module 170, a processor 180 including one or more processing cores and a power supply 190, etc. It may be appreciated by those skilled in the art that, the structure of the terminal device shown in FIG. 12 does not constitute a limitation to the terminal device, and it may include more or less components than what is illustrated, or combine some components, or have different component arrangements. Wherein:

The communication unit 110 may be configured to transmit and receive information, or to transmit and receive signal during a procedure of calling. The communication unit 110 may be a network communication device such as a RF (Radio Frequency) circuit, a router and a modem, etc. In particular, when the communication unit 110 is a RF circuit, the communication unit 110 receives downlink information from a base station, and then transfers the information to one or more processors 180 to be processed. Also, the communication unit 110 transmits uplink data to the base station. Generally, the RF circuit as a communication unit includes, but is not limited to, an antenna, at least one amplifier, a tuner, one or more oscillators, a subscriber identity module (SIM) card, a transceiver, a coupler, an LNA (Low Noise Amplifier) and a duplexer, etc. Furthermore, the communication unit 110 may communicate with a network and other devices through wireless communication. The wireless communication may use any communication standards or protocols, including, but being not limited to, GSM (Global System of Mobile communication), GPRS (General Packet Radio Service), CDMA (Code Division Multiple Access), WCDMA (Wideband Code Division Multiple Access), LTE (Long Term Evolution), e-mail and SMS (Short Messaging Service), etc. The memory 120 may be configured to store software programs and modules. The processor 180 performs various functional applications and data processing by running the software programs and modules stored in the memory 120. The memory 120 may generally include a program storage area and a data storage area, wherein the program storage area may store operating systems, application programs required by at least one function (such as a function of sound playback and a function of image playback, etc.), etc.; and the data storage area may store data created during operation of the terminal device 1100 (such as audio data and a phone book, etc.), etc. In addition, the memory 120 may include a high-speed random access memory and may also include a non-volatile memory. For example, the memory 120 may include at least one disk storage device, a flash memory device or other volatile solid-state memory devices. Accordingly, the memory 120 may also include a memory controller to provide access to the memory 120 performed by the processor 180 and the input unit 130.

The input unit 130 may be configured to receive input numbers or a character, and generate keyboard, mouse, joystick, optical or trackball input signals related to a user setting and the functional control. The input unit 130 may include a touch sensitive surface 131 and other input device 132. The touch sensitive surface 131, is also known as a touch screen or a track pad, may collect user's gestures on or near it (such as an operation performed by users using any suitable object or accessory such as a finger, a touch pen and the like on or near the touch sensitive surface 131), and drive a corresponding connected device according to a preset program. Optionally, the touch sensitive surface 131 may include two parts of a touch detection device and a touch controller. Here, the touch detection device detects a touching position of the user, detects a signal caused by the user gesture, and transmits the signal to the touch controller. The touch controller receives touch information from the touch detection device, transforms it into coordinates of the touch point, and sends the coordinates to the processor 180. The touch controller may also receive a command from the processor 180 and execute the command. In addition, the touch sensitive surface 131 may be realized in various types, such as resistive type, capacitive type, infrared type and surface acoustic wave type, etc. In addition to the touch sensitive surface 131, the input unit 130 may also include other input device 132. The other input device 132 may include, but is not limited to, one or more of a physical keyboard, functional keys (such as volume control keys, switch buttons, etc.), a trackball, a mouse and a joystick, etc.

The display unit 140 may be configured to display information input by the user or information provided for the user and various graphical user interfaces of the terminal device 1100. These graphical user interfaces may consist of graphics, texts, icons, videos and any combination thereof. The display unit 140 may include a display panel 141, and optionally, the display panel 141 may be configured with LCD (Liquid Crystal Display) or OLED (Organic Light-Emitting Diode), etc. Further, the touch sensitive surface 131 may cover the display panel 141. When a user gesture on or near the touch sensitive surface 131 is detected by the touch sensitive surface 131, the user gesture is sent to the processor 180 to determine the type of touch event, and then corresponding visual output will be provided on the display panel 141 by the processor 180 according to the type of touch event. Although in FIG. 12, the touch sensitive surface 131 and the display panel 141 are two separate components to realize input and output functions, in some embodiments, the touch sensitive surface 131 and the display panel 141 may be integrated to realize input and output functions.

The terminal device 1100 may further include at least one kind of sensor 150, such as a light sensor, a motion sensor and other sensors. The light sensor may include an ambient light sensor and a proximity sensor. Here, the ambient light sensor may adjust the brightness of the display panel 141 according to the brightness of the ambient light. The proximity sensor may turn off the display panel 141 and/or backlight when the terminal device 1100 moves close to ear. As one kind of the motion sensor, a gravity acceleration sensor may detect accelerations in every direction (typically on three axes), and may detect the magnitude and the direction of gravity when it is stationary, which may be used in applications for recognizing poses of the mobile phone (such as horizontal and vertical screen switching, related games and pose calibration of a magnetometer) and functions related to vibration recognizing (such as a pedometer and knocking), etc. The terminal device 1100 may also be equipped with other sensors such as a gyroscope, a barometer, a hygrometer, a thermometer and an infrared sensor, etc., which will not be redundantly described herein.

The audio circuit 160, a speaker 161 and a microphone 162 may provide an audio interface between the user and the terminal device 1100. The audio circuit 160 may transform received audio data into electrical signals which are transmitted to the speaker 161 and transformed into sound signals to be output by the speaker 161. On the other hand, the microphone 162 transforms collected sound signals into electrical signals which are received and transformed into audio data by the audio circuit 160. After being output to the processor 180 to be processed, the audio data is transmitted to, for example, another terminal device via the RF circuit 110, or output to the memory 120 for further processing. The audio circuit 160 may also include an ear bud jack to allow a communication between an external earphone and the terminal device 1100.

In order to achieve wireless communication, the terminal device may be equipped with a wireless communication unit 170 which may be a WiFi module. WiFi is a short-range wireless transmission technology. The terminal device 1100 allows the user to send and receive emails, browse webpages and access streaming media, etc, through the wireless communication unit 170, which provides the user with a wireless broadband Internet access. Although FIG. 12 shows the wireless communication unit 170, it may be appreciated that, the wireless communication unit 170 may not a component of the terminal device 1100, and may be omitted as desired without changing the scope of the disclosure.

The processor 180 is a control center of the terminal device 1100 that connects various parts of the entire mobile phone through various interfaces and circuits, performs various functions and data processing of the terminal device 1100 by running or executing the software programs and/or modules stored in the memory 120 and by invoking data stored in the memory 120, so as to monitor the overall mobile phone. Optionally, the processor 180 may include one or more processing cores. The processor 180 may be integrated with an application processor that generally processes operating systems, user interfaces and application programs, and a modem processor that generally processes the wireless communication. It may be appreciated that, the above modem processor may not be integrated into the processor 180.

The terminal device 1100 may also include the power supply 190 (such as a battery) to supply power to each component. The power supply may be logically connected to the processor 180 through a power supply management system, so as to achieve the functions such as charge, discharge and power consumption managements, etc. through the power supply management system. The power supply 190 may also include one or more components of a DC or AC power, a recharge system, a power failure detection circuit, a power converter or an inverter and a power status indicator, etc.

Although not shown, the terminal device 1100 may also include a camera and a Bluetooth module, etc., which are not redundantly described herein. In the present embodiment, the display unit of the terminal device is a touch screen display, and the terminal device further includes a memory and one or more programs stored in the memory, and the terminal device is configured to execute the one or more programs by one or more processors, and the one or more programs containing instructions to perform the following operations: detecting a touch point of a user gesture acting on the touch screen, wherein the touch point falls into a touch point node; searching a plurality of nodes of the contents to find a nearest text node to the touch point, when the touch point node is not a text node; and selecting a nearest character to the touch point within the nearest text node.

In addition, the mobile terminal according to an embodiment of the present disclosure may typically be various handheld terminal devices such as a mobile phone and a personal digital assistant (PDA), etc. Therefore, the scope of the present disclosure is not limited to a particular type of mobile terminal.

In addition, the method according to an embodiment of the present disclosure may also be implemented as a computer program executed by a CPU. When executed by the CPU, the computer program performs the above functions defined in the method according to an embodiment of the present disclosure.

In addition, the above steps of the method and the units of the system may also by implemented with a controller and a computer-readable storage device which stores computer programs that cause the controller to realize the above steps and functions of the units.

In addition, it may be appreciated that the above mentioned computer-readable storage device may be a volatile memory or a nonvolatile memory, or may include the both. For example, but without limitation, the nonvolatile memory may include a read only memory (ROM), a programmable ROM (PROM), an electrically programmable ROM (EPROM), an electrically erasable programmable ROM (EEPROM) or a flash memory. The volatile memory may include a random access memory (RAM) which may serve as an external cache RAM memory. As an example, but without limitation, the RAM may be of various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The storage device according to the disclosed aspects is intended to include but is not limited to these and other suitable types of memories.

It may be appreciated by those skilled in the art that, various exemplary logical blocks, modules, circuits and algorithm steps described in conjunction with the present disclosure may be implemented as electronic hardware, computer software or combination of both. In order to clearly illustrate the interchangeability between the hardware and the software, a general description has been given to various illustrative components, blocks, modules, circuits and functions of steps. Whether such functions will be implemented as software or hardware depends on particular applications and the restrictions applied to the design of the whole system. Those functions may be realized in various means with respect to each of the particular applications by those skilled in the art without departing the scope of the present disclosure.

Various illustrative logical blocks, modules and circuits described in conjunction with the present disclosure may be implemented or performed by the following components that are designed to perform the above functions: a general purpose processor, a digital signal processor (DSP), a dedicated integrated circuit (ASIC), a field programmable gate array (FPGA) or other programmable logic device, discrete gates or transistor logics, discrete hardware components or any combination of these components. The general purpose processor may be a microprocessor. Alternatively, the processor may be any one of a conventional processor, a controller, a microcontroller or a state machine. The processor may be implemented as combination of computing devices, such as combination of a DSP and a microprocessor, a plurality of microprocessors, one or more microprocessors in conjunction with a DSP core, or any other such configuration.

The method and steps of the algorithm described in conjunction with the present disclosure may be directly contained in hardware, in a software module executed by a processor or in combination of the both. The software may reside in a RAM memory, a flash memory, a ROM memory, an EPROM memory, an EEPROM memory, a registers, a hard disk, a removable disk, a CD-ROM, or any other storage medium known in the art. An exemplary storage medium is coupled to the processor such the processor can read information from the storage medium or write information thereto. In an alternative embodiment, the storage medium maybe integrated with the processor. The processor and the storage medium may reside in an ASIC which may reside in a user terminal. In an alternative embodiment, the processor and the storage medium may reside in a user terminal as discrete components.

In one or more exemplary designs, the above functions may be implemented in hardware, software, firmware or any combination thereof. If implemented in software, the above functions may be stored in a computer readable medium as one or more instructions or codes, or transmitted through the computer readable medium. The computer readable medium includes computer storage medium and communication medium. The communication media includes any medium that may be used to transmit computer programs from one location to another location. The storage medium may be any available medium that is accessible by a general or special computer. For example, but without limitation, the computer readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called as a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks and a blue-ray disk, wherein the magnetic disk normally represents data magnetically, and the optical disk represents data optically by utilizing a laser. The combination of the above may also be included in the scope of the computer readable medium.

Although the exemplary embodiments of the present disclosure have been illustrated in the above, it may be noticed that, various alteration and modification may be made without departing the scope of the present disclosure, which is defined by the claims. The functions, steps and/or operations of the method claims according to the described embodiments of the present disclosure, may not be performed in a particular order. In addition, although elements of the present disclosure may be described or prescribed in a single form, multiple forms may also be devised, unless the single form is explicitly prescribed.

The objects, technical solutions and advantageous effects of the present disclosure have been explained in a further detail with the above specific embodiments. It may be appreciated that, the above are merely specific embodiments of the present disclosure, and not used to limit the scope of the present disclosure. Any alteration, equivalent replacement, modification and the like within the spirit and principle of the present disclosure may be embraced in the protection scope of the present disclosure.

What is claimed is:

1. A method for selecting a character from content displayed in a touch screen, comprising:
    detecting a touch point of a user gesture acting on the touch screen, wherein the touch point falls into a touch point node;
    searching a plurality of nodes of the contents to find a nearest text node to the touch point, when the touch point node is not a text node; and
    selecting a nearest character to the touch point within the nearest text node, wherein the plurality of nodes are organized as a node tree, and wherein searching the plurality of nodes comprises:
determining whether the touch point node contains any text node;
calculating the distance between the touch point and each text node contained in the touch point node when the touch point node contains at least one text node; and
selecting the text node of the smallest distance as the nearest text node to the touch point.

2. The method according to claim 1, further comprising: determining whether the touch point node is a body node,
wherein whether the touch point node contains the text node is determined after it is determined that the touch point node is not a body node.

3. The method according to claim 1, further comprising:
determining whether a sibling node of the touch point node contains any text node, when the touch point node does not contain at least one text node; and
calculating the distance between each text node contained in the sibling node and the touch point when the sibling node contains at least one text node.

4. The method according to claim 1, further comprising:
determining whether a sibling node of a parent node of the touch point node contains any text node, when none of the sibling nodes of the touch point node contains any text node; and
calculating the distance between each text node contained in the sibling node of the parent node of the touch point node and the touch point when the sibling node of the parent node of the touch point node contains at least one text node.

5. The method according to claim 1, wherein calculating comprises:
determining the coordinates of the four vertex of the at least one text node; and
calculating the distance between the touch point and each text node according to the coordinates of the touch point and the coordinates of the four vertex of the at least one text node.

6. The method according to claim 5, wherein the coordinates of the touch point are (m, n), the coordinates of the lower left vertex of a text node are $(x_1, y_1)$, the coordinates of the upper left vertex are $(x_1, y_2)$, the coordinates of the upper right vertex are $(x_2, y_2)$, and the coordinates of the lower right vertex are $(x_2, y_1)$, wherein calculating comprises:

if $m<x_1$, and $n<y_2$, the distance is $\sqrt{(x_1-m)^2+(n-y_2)^2}$;
if $m<x_1$, and $y_2\leq n\leq y_1$, the distance is $|x_1-m|$;
if $m<x_1$, and $n>y_1$, the distance is $\sqrt{(x_1-m)^2+(n-y_1)^2}$;
if $x_1\leq m\leq x_2$, and $n>y_1$, the distance is $|y_1-n|$;
if $m>x_2$, and $n>y_1$, the distance is $\sqrt{(x_2-m)^2+(y_1-n)^2}$;
if $m>x_2$, and $y_2\leq n\leq y_1$, the distance is $|m-x_2|$;
if $m>x_2$, and $n<y_2$, the distance is $\sqrt{(x_2-m)^2+(y_2-n)^2}$; and
if $x_1\leq m\leq x_2$, and $n<y_2$, the distance is $|n-y_2|$.

7. The method according to claim 1, wherein selecting the nearest character to the touch point within the nearest text node comprises:
determining the coordinates of the nearest character to the touch point; and
selecting the character according to the determined coordinates.

8. The method according to claim 7, wherein determining the coordinates of the nearest character to the touch point comprises:

if $m<x_1$, and $n<y_2$, the coordinates of the nearest character are $(x_1+\frac{1}{2}\times w, y_2+\frac{1}{2}\times h)$;
if $m<x_1$, and $y_2\leq n\leq y_1$, the coordinates of the nearest character are $(x_1+\frac{1}{2}\times w, n)$;
if $m<x_1$, and $n>y_1$, the coordinates of the nearest character are $(x_1+\frac{1}{2}\times w, y_1-\frac{1}{2}h)$;
if $x_1\leq m\leq x_2$, and $n>y_1$, the coordinates of the nearest character are $(m, y_1-\frac{1}{2}\times h)$;
if $m>x_2$, and $n>y_1$, the coordinate of the nearest character are $(x_2-\frac{1}{2}\times w, y_1 31\ \frac{1}{2}\times h)$;
if $m>x_2$, and $y_2\leq n\leq y_1$, the coordinates of the nearest character are $(x_2-\frac{1}{2}\times w, n)$;
if $m>x_2$, and $n<y_2$, the coordinates of the nearest character are $(x_2-\frac{1}{2}\times h)$; and
if $x_1\leq m\leq x_2$, and $n<y_2$, the coordinates of the nearest character are $(m, y_2+\frac{1}{2}\times h)$, wherein w is the width of a character, and h is the height of a character.

9. The method according to claim 1, wherein the text node is a visible text node.

10. A terminal device, comprising:
a touch screen for displaying content;
a processor; and
a memory for storing instructions executable by the processor,
wherein the processor is configured to execute instructions for:
detecting a touch point of a user gesture acting on the touch screen, wherein the touch point falls into a touch point node;
searching a plurality of nodes of the contents to find a nearest text node to the touch point, when the touch point node is not a text node; and
selecting a nearest character to the touch point within the nearest text node,
wherein the plurality of nodes are organized as a node tree, and wherein searching the plurality of nodes comprises:
determining whether the touch point node contains any text node;
calculating the distance between the touch point and each text node contained in the touch point node when the touch point node contains at least one text node; and
selecting the text node of the smallest distance as the nearest text node to the touch point.

11. The terminal device according to claim 10, wherein the processor is further configured to execute instructions for: determining whether the touch point node is a body node,
wherein whether the touch point node contains the text node is determined after it is determined that the touch point node is not a body node.

12. The terminal device according to claim 10, wherein the processor is further configured to execute instructions for:
determining whether a sibling node of the touch point node contains any text node, when the touch point node does not contain at least one text node; and
calculating the distance between each text node contained in the sibling node and the touch point when the sibling node contains at least one text node.

13. The terminal device according to claim 10, wherein the processor is further configured to execute instructions for:
determining whether a sibling node of a parent node of the touch point node contains any text node, when none of the sibling nodes of the touch point node contains any text node; and calculating the distance between each text node contained in the sibling node of the parent node of the touch point node and the touch point when the sibling node of the parent node of the touch point node contains at least one text node.

14. The terminal device according to claim 10, wherein calculating comprises:
   determining the coordinates of the four vertex of the at least one text node; and
   calculating the distance between the touch point and each text node according to the coordinates of the touch point and the coordinates of the four vertex of the at least one text node.

15. The terminal device according to claim 14, wherein the coordinates of the touch point are (m, n), the coordinates of the lower left vertex of a text node are $(x_1, y_1)$, the coordinates of the upper left vertex are $(x_1, y_2)$, the coordinates of the upper right vertex are $(x_2, y_2)$, and the coordinates of the lower right vertex are $(x_2, y_1)$, wherein calculating comprises:
   if $m<x_1$, and $n<y_2$, the distance is $\sqrt{(x_1-m)^2-(n-y_2)^2}$;
   if $m<x_1$, and $y_2 \le n \le y_1$, the distance is $|x_1-m|$;
   if $m<x_1$, and $n>y_1$, the distance is $\sqrt{(x_1-m)^2+(n-y_1)^2}$;
   if $x_1 \le m \le x_2$, and $n>y_1$, the distance is $|y_1-n|$;
   if $m>x_2$, and $n>y_1$, the distance is $\sqrt{(x_2-m)^2+(y_1-n)^2}$;
   if $m>x_2$, and $y_2 \le n \le y_1$, the distance is $|m-x_2|$;
   if $m>x_2$, and $n<y_2$, the distance is $\sqrt{(x_2-m)^2+(y_2-n)^2}$; and
   if $x_1 \le m \le x_2$, and $n<y_2$, the distance is $|n-y_2|$.

16. The terminal device according to claim 10, wherein selecting the nearest character to the touch point within the nearest text node comprises:
   determining the coordinates of the nearest character to the touch point; and
   selecting the character according to the determined coordinates.

17. The terminal device according to claim 16, wherein determining the coordinates of the nearest character to the touch point comprises:
   if $m<x_1$, and $n<y_2$, the coordinates of the nearest character are $(x_1+\frac{1}{2}\times w, y_2 30\ \frac{1}{2}\times h)$;
   if $m<x_1$, and $y_2 \le n \le y_1$, the coordinates of the nearest character are $(x_1+\frac{1}{2}\times w, n)$;
   if $m<x_1$, and $n>y_1$, the coordinates of the nearest character are $(x_1+\frac{1}{2}\times w, y_1-\frac{1}{2}\times h)$;
   if $x_1 \le m \le x_2$, and $n>y_1$, the coordinates of the nearest character are $(m, y_1-\frac{1}{2}\times h)$;
   if $m>x_2$, and $n>y_1$, the coordinate of the nearest character are $(x_2-\frac{1}{2}\times w, y_1-\frac{1}{2}\times h)$;
   if $m>x_2$, and $y_2 \le n \le y_1$, the coordinates of the nearest character are $(x_2-\frac{1}{2}\times w, n)$;
   if $m<x_2$, and $n<y_2$, the coordinates of the nearest character are $(x_2-\frac{1}{2}\times w, y_2+\frac{1}{2}\times h)$; and
   if $x_1 \le m \le x_2$, and $n<y_2$, the coordinates of the nearest character are $(m, y_2+\frac{1}{2}\times h)$,
   wherein w is the width of a character, and h is the height of a character.

18. A non-transitory readable storage medium including instructions, executable by a processor in a terminal device, for performing the method for selecting a character from content displayed in a touch screen, the method comprising:
   detecting a touch point of a user gesture acting on the touch screen, wherein the touch point falls into a touch point node;
   searching a plurality of nodes of the contents to find a nearest text node to the touch point, when the touch point node is not a text node; and
   selecting a nearest character to the touch point within the nearest text node,
   wherein the plurality of nodes are organized as a node tree, and wherein searching the plurality of nodes comprises:
   determining whether the touch point node contains any text node;
   calculating the distance between the touch point and each text node contained in the touch point node when the touch point node contains at least one text node; and
   selecting the text node of the smallest distance as the nearest text node to the touch point.

19. The non-transitory readable storage medium according to claim 18, wherein the method further comprises:
   determining whether a sibling node of the touch point node contains any text node, when the touch point node does not contain at least one text node; and
   calculating the distance between each text node contained in the sibling node and the touch point when the sibling node contains at least one text node.

20. The non-transitory readable storage medium according to claim 18, wherein the method further comprises:
   determining whether a sibling node of a parent node of the touch point node contains any text node, when none of the sibling nodes of the touch point node contains any text node; and
   calculating the distance between each text node contained in the sibling node of the parent node of the touch point node and the touch point when the sibling node of the parent node of the touch point node contains at least one text node.

* * * * *